Feb. 12, 1935.  F. A. SMITH  1,991,181
FENDERWELL LOCK
Filed June 22, 1931    2 Sheets-Sheet 1

Inventor
Frederick A. Smith.
by Charles W. Hills
Attys.

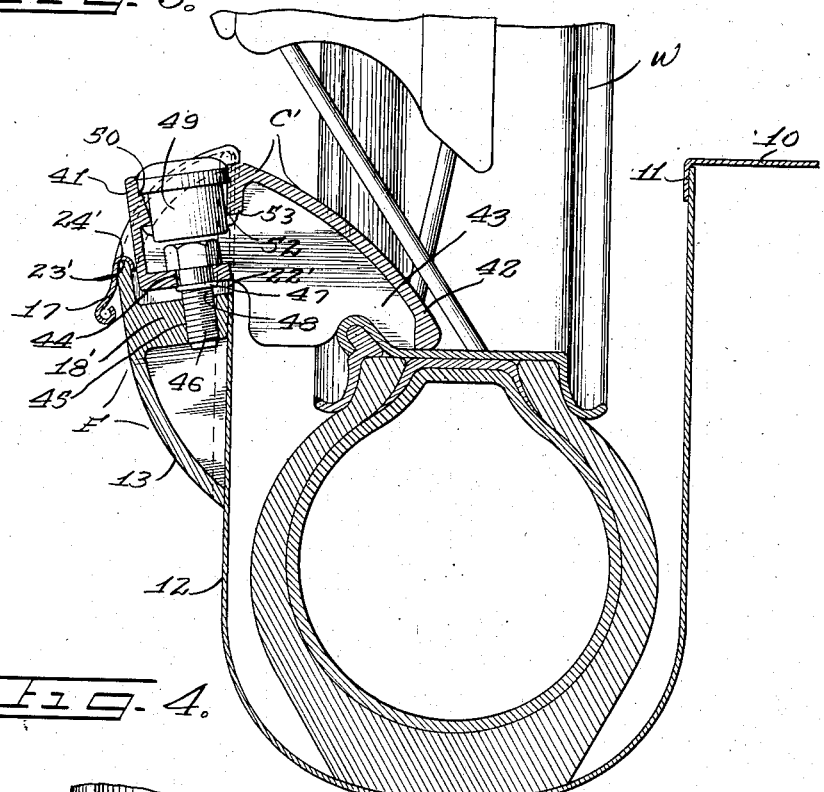
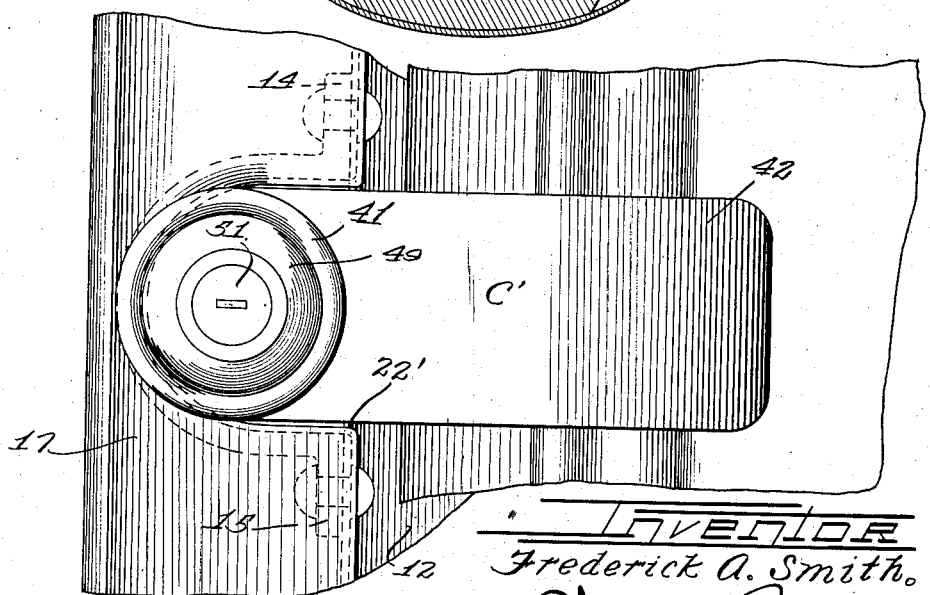

Patented Feb. 12, 1935

1,991,181

UNITED STATES PATENT OFFICE 1,991,181

FENDERWELL LOCK

Frederick A. Smith, North Chicago, Ill., assignor to Oakes Products Corporation, North Chicago, Ill., a corporation of Michigan Application June 22, 1931, Serial No. 545,943

9 Claims. (Cl. 70—90)

This invention relates to locking means and arrangement particularly useful for locking spare wheels or tires against theft from depressions or wells in automotive vehicle fenders.

The invention concerns particularly that type of locking arrangement in which a locking arm or bar is extended transversely of the well from one side thereof and is secured and locked to its support to be in position over or in pressure engagement with the lower part of the spare wheel or tire seated in the well.

On some automobiles the fender wells are comparatively deep and an important object of my invention is to provide improved locking means and arrangement for efficiently locking spare wheels or tires in such deep wells, at the same time bracing and strengthening the fender and the well at the point of application of the locking means, produce a neat appearance, and eliminate all obstructions on the top of the fender.

The various features of my invention are incorporated in the structure shown on the drawings, in which drawings Figure 1 is a vertical section through a spare wheel and fender well and the locking means applied thereto;

Figure 3 is a view similar to Figure 1 showing a modified arrangement; and

Figure 4 is a plan view of the locking arrangement of Figure 3.

Figure 1:
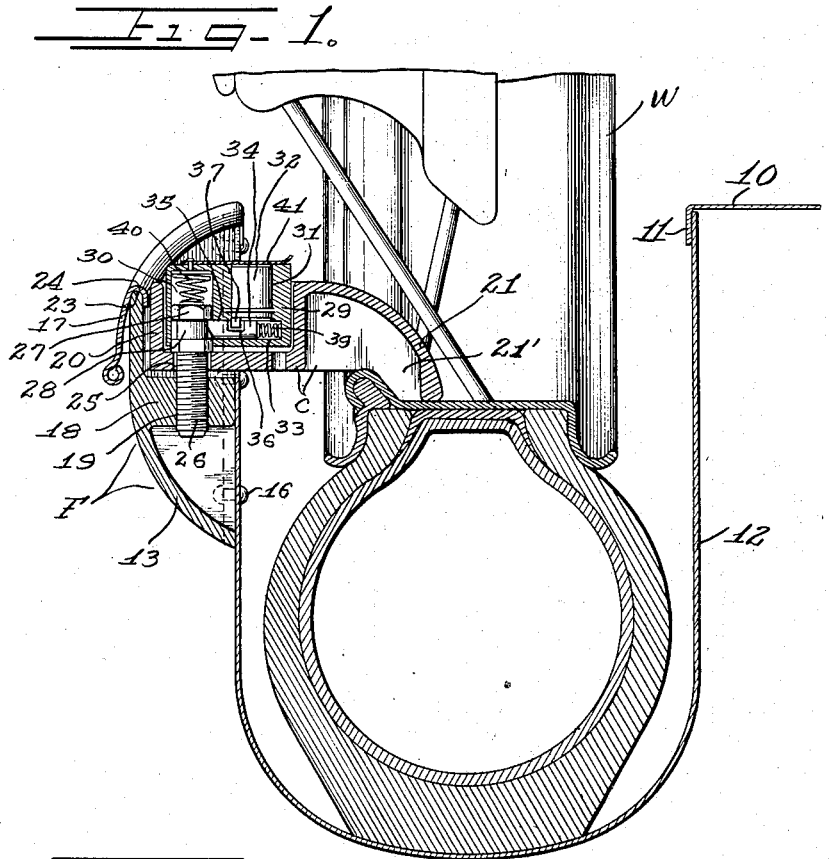

The fender 10 is cut away to leave a rectangular opening and the fender metal around this opening is deflected downwardly to form a flange 11 to which the well frame 12 is secured at its upper end by welding, riveting or otherwise to depend below the fender opening. I have shown a spare wheel W supported in the well.

The locking mechanism comprises a fitting F which may be a casting, and which comprises outer wall 13 which is longitudinally arc shaped and of substantially semi-circular horizontal cross-section and which at its longitudinal side edges is deflected laterally to form the lateral flanges 14 and 15 by means of which the fitting is secured against the outer wall of the well 12 as by means of welding, or by means of rivets 16 shown. The fitting is located below the depending roll or skirt 17 along the outer side of the fender and the curvature of the top of the fitting conforms to the skirt curvature so that the fitting will fit against the skirt.

At an intermediate point a horizontal supporting lug or ledge 18 extends inwardly from the wall 13 and has the vertical threaded hole 19 therethrough. The ledge 18 serves to secure the locking or clamping member C comprising the oblong cup-shaped housing or body part 20 and the arm 21 extending inwardly therefrom. In order that the body of the locking or clamping member may be applied to the ledge 18 the fender well wall above the ledge is cut away to leave the opening 22 and the fitting wall 13 at the top is provided with the opening 23 in register with the opening 22. The skirt 17 of the fender is also cut out to leave an opening and the metal around the opening being flanged or deflected around the edges of the fitting opening 23, as indicated at 24, thus leaving a smooth edge and giving a neat appearance.

Figure 2:
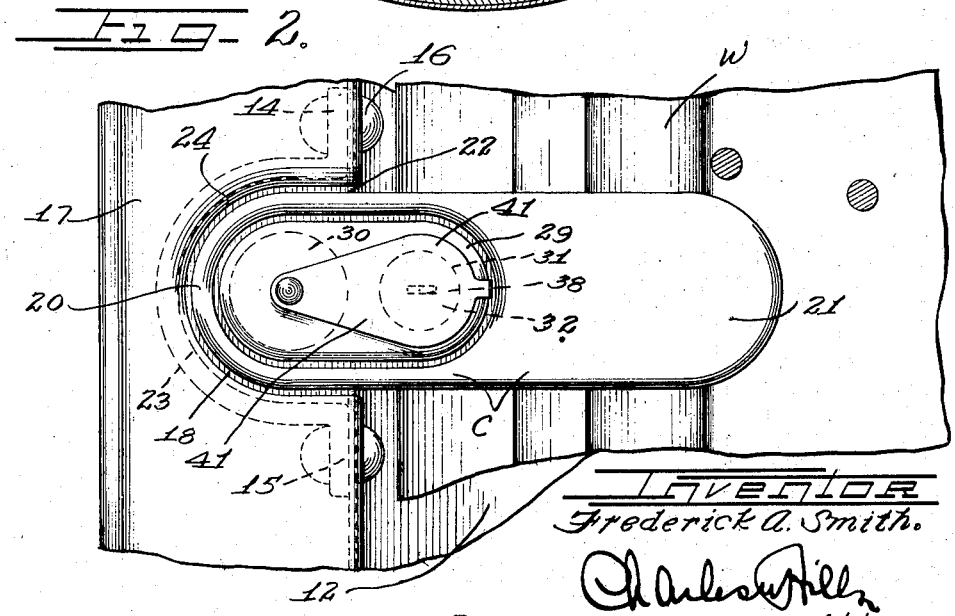
Figure 2 is a plan view of the locking means.

In its base the lock member housing 20 has the cylindrical hole 25 for registering with the threaded hole 19 through the ledge 18, and this hole 25 serves for passage therethrough of the shank of a screw 26 whose end is threaded for engaging in the threaded hole 19. In the arrangement of Figures 1 and 2 the screw has a head 27 which may be hexagonal for application thereto of a wrench or other tool, and which has the circumferential notch or locking channel 28. After the spare wheel or tire has been placed in the well the member C is applied with the end of the arm 21 over or against the lower part of the rim of the wheel or tire, and the screw 26 is then inserted through the hole 18 and turned for threaded engagement in the hole 19, the screw head then engaging the base of the housing 20 and drawing the locking member downwardly toward the ledge 18. If the end of the arm 21 is in engagement with the wheel or tire rim the downward movement of the member C by the turning of the screw will press the member against the rim and will clamp the wheel or tire structure securely in the well. As shown in Figure 2, the wall of the fitting 13 surrounded the ledge 18 is parallel with and close to the side wall of the housing 20 and the fitting C is therefore locked against lateral displacement. As shown, the arm 21 inclines downwardly from the top of the housing 20 and to strengthen the arm webs 21' may extend between the arm and the housing and these webs may conform at their outer ends with the top of the wheel rim or tire, as indicated at Figure 1.

In the arrangement of Figures 1 and 2, a lock or guard structure 29 is provided for the screw, this structure being oblong and of a shape to fit easily in the housing 20 of the locking element C. At one end the lock structure 29 has the cylindrical pocket 30 of a diameter to readily receive the screw head 27, the outer end of the cylindrical bore or pocket 30 being closed. Adjacent to the pocket 30 and parallel therewith the lock structure has the cylindrical pocket or bore 31 for receiving a lock cylinder 32. At the bottom of the bore 31 is the transverse guide channel 33 for the lock detent 34, the guide channel 33 communicating with the pocket 30 through the passageway 35 so that the lock detent or bolt may be projected into the pocket 30 and into the locking channel or notch 28 in the screw head. The lock detent or bolt has the cross notch 36 into which projects the cam or eccentric extension 37 on the lock cylinder 32 so that when the lock cylinder is turned by means of a key applied in the keyhole 38 the lock detent may be shifted into or out of the screw head locking channel. If desired, a spring 39 may be interposed between the lock detent and the outer end of the channel 33 for shifting the detent outwardly when the lock cylinder is released. The outer end of the detent is beveled so that when the structure 29 is applied to receive the screw head in the pocket 30 the detent will be cammed out of the way by the top of the head until it comes into registration with the locking channel 28, when the spring 39 will shift the detent into the channel and then lock the structure 29 to the screw head. A compression spring 40 may be anchored to the top wall of the pocket 30 to be compressed when the structure 29 is applied to the screw head so that rattling of the lock structure 29 and noise will be prevented as the vehicle is traveling. A dust shield or guard 41 may be pivoted on the structure 29 to be swung into position over the keyhole when the key is withdrawn, thus preventing entrance of dust or moisture to the lock cylinder parts.

The drawing shows the member C in locking position, the spare wheel being clamped and securely held in the well 12. If it is desired to remove the wheel, the key is inserted in the keyhole 38 and the lock cylinder is turned to withdraw the lock detent from the locking channel 28 and the lock structure 29 may then be withdrawn from the housing 20. A wrench or other suitable tool is now applied to the screw head and the screw is unscrewed from the ledge 18 whereupon the member C may be withdrawn from the spare wheel or tire. When locking is again desired the member C is applied to the spare wheel or tire, the screw is turned down and then the lock structure 29 is pushed down over the screw head until the lock detent snaps itself into the locking channel of the screw head and the engagement of the oblong lock structure 29 in the oblong housing 20 will prevent movement of the lock structure 29 relative to the screw and the member C. The lock structure fits close enough in the housing 20 to make it difficult for the application of a tool for the purpose of unlawfully removing the lock structure.

The fitting F serves the dual purpose of providing a support for the locking element C and for bracing and strengthening the well and the fender skirt. In the arrangement of Figures 1 and 2 the locking element, when in locking position, is entirely below the fender skirt 17 but is readily accessible for application of the key and removal of the various parts from the fender well structure.

In the modified arrangement of Figures 3 and 4 the fitting F is of substantially the same construction as in the arrangement of Figures 1 and 2, it comprising the wall 13 of substantially semi-circular cross-section, and the lateral flanges 14 and 15 by means of which the fitting is secured to the outer side of the well as by rivets 16. The ledge 18' for supporting the locking structure may be slightly inclined, and at its upper part the wall 13 has the opening 23' in register with the opening 22' in the fenderwell wall above the ledge, the fender skirt 17 having a registering opening and the metal around the opening being deflected down to flange or deflect around the edge surrounding the opening 23', as indicated at 24'.

The locking member C' comprises a cup-shaped body part or housing 41 from the upper part of which the arm 42 extends gradually downwardly and is strengthened by webs 43 extending therebetween and the housing 41. The base of the housing 41 has the cylindrical hole 44 therethrough in register with the threaded hole 45 through the ledge 18', the hole 44 serving to receive the shank of a screw 46 for engagement of its threaded end in the threaded hole 45 so that the locking member C' may be drawn down to bring its arm 42 into engagement with the rim of a spare wheel or tire to be locked in the well. As the screw is turned down the arm 42 will engage with and exert pressure against the wheel or tire rim and will lock the wheel or tire securely in the well to prevent displacement thereof, and the webs 43 may be shaped to accurately fit the contour of the wheel or tire rim, as shown in Figure 3. If desired, the screw 46 may be retained by the base of the housing 41 against axial displacement and I have shown a locking ring or key 47 seating in the circumferential channel 48 in the screw shank a distance below the screw head. With this arrangement when the screw is unturned and raised from the ledge 18 the locking structure C' will be carried therewith and the screw will not become displaced and lost and will always be retained on the structure C'.

The means shown for preventing unlawful access to the screw comprises a lock plug or cylinder 49 whose head seats on the annular shoulder 50 formed at the upper end of the housing 41 and which carries a rotatable lock barrel 51 adapted to be turned by a suitable key to shift the locking detents 52 into or out of engagement with the annular locking shoulder 53 within the housing. With this lock cylinder or plug locked to the outer end of the housing 41 it will be impossible to gain access with a tool to the head of the screw. When a key is inserted in the lock barrel and the detents 52 are withdrawn the lock cylinder may be withdrawn and then a wrench or other suitable tool may be applied to the screw for removal of the locking structure C'. The engagement of the outer end of the locking structure C' in the opening 23' of the fitting F will prevent lateral movement of the locking structure when in locking position relative to the spare wheel or tire.

I have shown efficient and practical embodiments of the features of my invention but I do not desire to be limited to the exact construction and arrangement shown and described as changes and modifications may be made without departing from the scope of the invention as defined in the appended claims.

I claim as follows:

1. In combination with a spare tire lock construction, a fender having a spare tire receiving well, a supporting fitting secured at one side of the well below the fender top and having a recess provided in its base with a threaded opening, the top of the fender and the adjacent well wall having a passageway above said recess, a clamping member applicable through said passageway and in said recess and having an opening in its base registering with said threaded opening and having an arm for extending into the well into engagement with the rim of the spare tire therein, a screw extending through said clamping member for threaded engagement in said threaded opening to clamp said clamping member against the spare tire rim.

2. The combination with a fender having a well therein for receiving a spare wheel or tire, of a fitting secured at the side of the well below the top of the fender, said fitting having an opening at the top and a wall below said opening provided with a threaded passageway, passageways provided in the fender top and adjacent well wall over the open end of said fitting, a clamping member comprising a body having a vertical recess and an arm extending therefrom for engagement with the rim of a spare wheel or tire in the well, said clamping member being adapted for application through said passageways and having a hole in the base of its body part for registering with said threaded passageway and for receiving the shank of a screw for threaded engagement in said passageway to move said clamping member toward said wall for clamping engagement of its arms with the rim of the spare wheel or tire, and a lock structure received in said recess for interlocking engagement with the screw head to prevent access thereto.

3. The combination with a fender having a well for a spare wheel or tire, a locking member, a fitting secured to the fender wall for supporting said locking member for extension into said well over the rim of a spare wheel or tire, said fitting being below the fender top and the fender top having an access opening therein for application of the locking member to the fitting, a screw for securing the locking member to the fitting, and a lock structure on the locking member for preventing access to the screw.

4. The combination with a fender having a depending skirt along its outer edge and a well inside of said skirt for receiving a spare wheel or tire, a fitting secured to the well wall below said skirt, a lateral wall in said fitting below the top thereof, a clamping member for engagement in said fitting above said wall to extend into said well above the rim of a spare wheel or tire therein, a screw for securing said locking member to said wall, and a lock structure on said locking member for preventing access to said screw.

5. The combination of a fender having a depending skirt along its outer side and a well within the skirt for receiving a spare wheel or tire, and clamping means for the spare wheel or tire comprising a fitting secured to the outer wall of the well below the fender skirt, an arm seating at its outer end in said fitting for clamping engagement at its inner end with the spare wheel or tire rim, and a screw for securing the arm to the fitting, said skirt having a passageway for access to said screw.

6. The combination with a fender having a well for a spare wheel or tire, a fitting secured to the fender, said fitting having a recess open to the well below the top thereof, an arm fitting at its outer end in said recess with its inner end projecting into said well, securing means engaging with said arm in said fitting and operable to move said arm to apply its inner end with clamping engagement against the rim of a spare wheel or tire in the well, and lock controlled means mounted on said arm for preventing operation of said securing means.

7. The combination with a fender having a well for a spare wheel or tire, a fitting secured to the fender, said fitting having a recess open to the well below the top thereof, an arm fitting at its outer end in said recess with its inner end projecting into said well, securing means engaging with said arm in said fitting and operable to move said arm to apply its inner end with a clamping engagement against the rim of a spare wheel or tire in the well, and lock controlled means mounted on said arm for preventing operation of said securing means, the side walls of said recess forming abutments for preventing lateral displacement of said arm when in rim clamping position.

8. The combination with a fender having a well for a spare wheel or tire, a fitting secured to the outer wall of the well below the top of the well, said fitting having a front wall and a bottom wall and side walls forming a recess open at the top and open at the rear side to said well, a locking arm fitting at its outer end in said recess and held by the recess walls against lateral movement and with its inner end projecting into said well above the rim of a spare wheel or tire in the well, and securing means engaging with said arm and the bottom wall of said fitting and operable to move said arm to clamp its inner end against the spare wheel or tire rim to thereby hold the spare wheel or tire securely in the well against unauthorized removal thereof.

9. In combination, a fender well for supporting a spare wheel or tire, a fitting secured to a side wall of the well, said fitting having a recess open only at the top and to the well, a locking arm fitting at its outer end in said recess and with its inner end projecting into the well below the top thereof to be above the rim of a spare wheel or tire in the well, and securing means engaging said arm and said fitting and accessible through the top of said recess for operation to move said arm to clamp its inner end against the rim of a wheel or tire.

FREDERICK A. SMITH.